United States Patent
Inoue

(10) Patent No.: US 8,594,952 B2
(45) Date of Patent: Nov. 26, 2013

(54) METHOD FOR MEASURING MECHANICAL POWER DISSIPATION IN A VIBRATORY SYSTEM

(75) Inventor: Akira Inoue, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 13/076,943

(22) Filed: Mar. 31, 2011

(65) Prior Publication Data

US 2012/0247177 A1 Oct. 4, 2012

(51) Int. Cl.
*G01M 17/04* (2006.01)

(52) U.S. Cl.
USPC .......................................................... 702/44

(58) Field of Classification Search
USPC .......................................................... 702/44
See application file for complete search history.

(56) References Cited

PUBLICATIONS

The Fundamentals of Modal Testing, Application Note 243-3, Copyright © 1997, 2000 Agilent Technologies Printed in U.S.A. May 2000, 56 pages.*

Inoue, et al., Absolute and relative path measures in a discrete sytem by using two analytical methods: J of Sound and Vibration, 2008.
Inoue, et al., "Errors Associated wtih Transfer Path Analysis when Rotations are not Measured" SAE 2007-1-2179, 2007.

* cited by examiner

*Primary Examiner* — Tung S Lau
(74) *Attorney, Agent, or Firm* — Gifford, Krass, Sprinkle, Anderson & Citkowski, P.C.

(57) ABSTRACT

A method for determining mechanical power dissipation in a vibratory system, assuming the system is linear time-invariant and steady-state. The method includes the steps of identifying connection points between the vibratory system and components outside the vibratory system. The acceleration is measured at each connection point in a windowed time domain and the force at each connection point is also determined for the windowed time domain. The time domain values are converted into the frequency domain values by the fast Fourier transform, and the frequency domain acceleration values are converted to velocity values. The power dissipation of the vibratory system then equals the summation of one half of the power flow into the vibratory system. Here, each power flow is one half of the real part of the product of complex-conjugated velocity times force at the connection point in the frequency domain for each time window.

12 Claims, 3 Drawing Sheets

(Direct Force Estimation)

METHOD FOR MEASURING MECHANICAL POWER DISSIPATION IN A VIBRATORY SYSTEM

BACKGROUND OF THE INVENTION

I. Field of the Invention

The present invention relates to a method for measuring/estimating mechanical power dissipation in a vibratory system.

II. Description of Related Art

In many situations, such as the design of vibration isolators or shock absorbers, such as engine mounts and suspensions, in an automotive vehicle, it is desirable to determine the power dissipation of the vibration isolator or shock absorber for improved design of the vibration isolator or shock absorber for the vehicle.

During the previous design of such vibration isolators or shock absorbers for vehicles, the mechanical power dissipation is typically estimated only at each point, either the upper or bottom connection point of the component, as the power flow. This estimated power flow, however, does not accurately represent or correspond to the power dissipation in the component. These inaccuracies, furthermore, may result in inaccurate or improper design of the vibration isolators or shock absorbers for the vehicle.

SUMMARY OF THE PRESENT INVENTION

The present invention provides a method for accurately estimating the power dissipation in a vibratory system.

In the method of the present invention, the connection points between the vibratory system and components outside the vibratory system are identified. Thereafter, the acceleration at each connection point is measured in the time domain in the steady state of vibration. This is typically achieved by attaching an accelerometer (a sensor to measure acceleration) to the vibratory system at each connection point.

Thereafter, the force at each connection point is also determined in the time domain. This force may be determined either by direct installation of a force sensor between the vibratory system and components outside the vibratory system at each connection point, or estimated by exciting the vibratory system with a known force. Here, the direction toward the vibratory system is defined as the positive direction of the force.

The time domain values for both acceleration and force are then converted into the frequency domain for each time window typically by the fast Fourier transform which makes acceleration and force complex-valued.

The velocity values at the connection points of the vibratory system are then determined by dividing the acceleration in the frequency domain by $j\omega$ where $j$ equals the square root of $-1$ and $\omega$ equals the angular velocity in radians/second.

The power dissipation in the vibratory system is then determined by summing one half of the power flow into the vibratory system. The power flow is defined as one half of the real part of the product of velocity times force (here, either velocity or force is complex-conjugated value) in the frequency domain for each time window.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
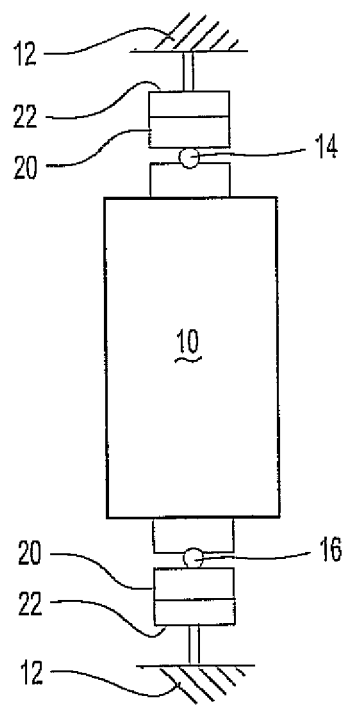
FIG. 1 is a diagrammatic view illustrating a vibratory system.

With reference first to FIG. 1, a vibratory system 10, such as a suspension or mount (isolator) of the type used in automotive vehicles, is diagrammatically illustrated. The vibratory system 10 illustrated in FIG. 1 is mechanically connected to components 12 outside the vibratory system 10 at an upper connection point 14 as well as a lower connection point 16. It will be understood, however, that the illustration of only two connection points 14 and 16 is by way of illustration only and that additional connection points may be utilized to attach the vibratory system 10 to the components 12 outside the vibratory system 10 without deviation from the spirit or scope of the present invention.

The time averaged mechanical power dissipation in the vibratory system 10 when in a steady state condition is equal to half of the power flow in the frequency domain into the component. In this case, the power flow into the component may occur at each connection point 14 and 16 so that, in order to accurately determine the power dissipation for the overall system 10, the power flow into the component or system 10 must be summed up for the all connection points 14 and 16.

$$\Pi_a(\omega) = Re[V_a^H(\omega) F_a(\omega)]/2$$

where $\Pi$=power flow at location a,
$\omega$=angular velocity (radians/second),
Re=real part,
a=location,
V=complex-valued velocity,
F=complex-valued force,
H=the conjugate transpose.

Generally, the velocity V and the force F are 6-dimensional vectors including the rotational degrees of freedom. Thus, $V=(V_x, V_y, V_z, \omega_x, \omega_y, \omega_z)^T$ and $F=(F_x, F_y, F_z, N_x, N_y, N_z)^T$, where N is torque (newton×meter) and T indicates transpose.

The power flow into the system 10 through each location a is defined as one half the real component of the complex-conjugate velocity multiplied by the force in the frequency domain. For the case in the drawing, the location a is the connection points 14 and 16.

The above defined power dissipation $\Pi$ in the frequency domain is also equal to the time averaged value of the velocity times force in the time domain or as follows:

$$\Pi_a(\omega) = \frac{1}{2} Re[V_a^H(\omega) F_a(\omega)] = \frac{1}{T} \int_0^T dt\, v_a(t, \omega) \cdot f_a(t, \omega)$$

where T=time window,
t=time,
v(t, $\omega$)=instantaneous velocity at t,
f(t, $\omega$)=instantaneous force at t The time averaged power dissipation in the vibratory system 10 is equal to one half of the total power flow into the vibratory system 10 or:

$$\int_{The\ system\ 10} dV \frac{1}{2} cv^2(t,\omega)_t = \frac{1}{2} \sum_a^{All\ external\ connections\ of\ the\ system\ 10} \Pi_a(\omega)$$

where c is the damping coefficient (newton×meter/second). Here, the integration is performed for the whole body of the vibratory system 10, and the subscript t indicates time averaged value.

Consequently, for the system illustrated in FIG. 1 which has only two connection points, i.e. the upper connection point 14 and the lower connection point 16, the power dissipation in the vibratory system 10 is determined by the power flow in accordance with the following formula:

$$\int_{The\ system\ 10} dV \frac{1}{2} cv^2(t,\omega)_t = \frac{1}{4} \text{Re}[V_{Upper}^H(\omega) F_{Upper}(\omega)] + \frac{1}{4} \text{Re}[V_{Lower}^H(\omega) F_{Lower}(\omega)]$$

One method of requiring both the velocity data and force data is to attach an accelerometer 20 to the vibratory system 10 at each connection point 14 as well as a force sensor 22 at each connection point 14 and 16. Thus, with both the accelerometer 20 and force sensor 22 connected to the vibratory system 10 at each connection point 14 and 16, accurate real time data may be obtained for both the acceleration and force at each connection point 14 and 16. After the fast Fourier transform, the acceleration may then be converted to velocity in the frequency domain by dividing by $j\omega$.

Figure 2:
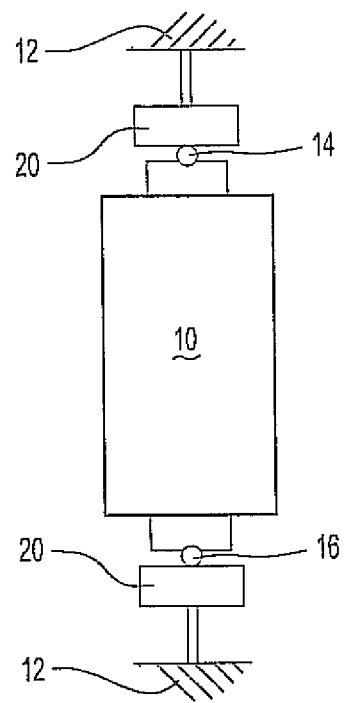
FIG. 2 is a view similar to FIG. 1, but illustrating a modification of the vibratory system.

While the attachment of an accelerometer 20 at each connection point 14 and 16 is trivial, the insertion of a force sensor many times is not. However, the operational force at each connection point 14 and 16 may be estimated by the operational acceleration at the points 14 and 16 and the frequency response functions between the points 14 and 16. The frequency response functions are measured by attaching an accelerometer 20 at each connection point 14 and 16 as shown in FIG. 2 and then applying a known excitation force at each of the connection points 14 and 16. Any conventional means, such as a hammer or shaker, may be used to apply the force. The frequency response function matrix among the external connection points is:

$$[A/F]_{2 \times 2} = \begin{pmatrix} A_U/F_U & A_U/F_L \\ A_L/F_U & A_L/F_L \end{pmatrix}$$

where A=acceleration (in the frequency domain),
F=force (in the frequency domain),
U=upper connection point 14,
L=lower connection point 16.

After the acceleration A is measured in the time domain, a fast Fourier transform (FFT) or wavelet transform is carried out to convert the time domain acceleration to the frequency domain acceleration. Acceleration in the frequency domain $A(\omega)$ is then converted to velocity $V(\omega)$ in the frequency domain as follows:

$$V = A/j\omega$$

The force at the upper and lower connection points 14 and 16 is then estimated as follows:

$$\begin{pmatrix} F_{Upper} \\ F_{Lower} \end{pmatrix} = [A/F]_{2 \times 2}^{-1} \begin{pmatrix} A_{Upper} \\ A_{Lower} \end{pmatrix}$$

where the matrix inverse is taken at each frequency.

Figure 3:
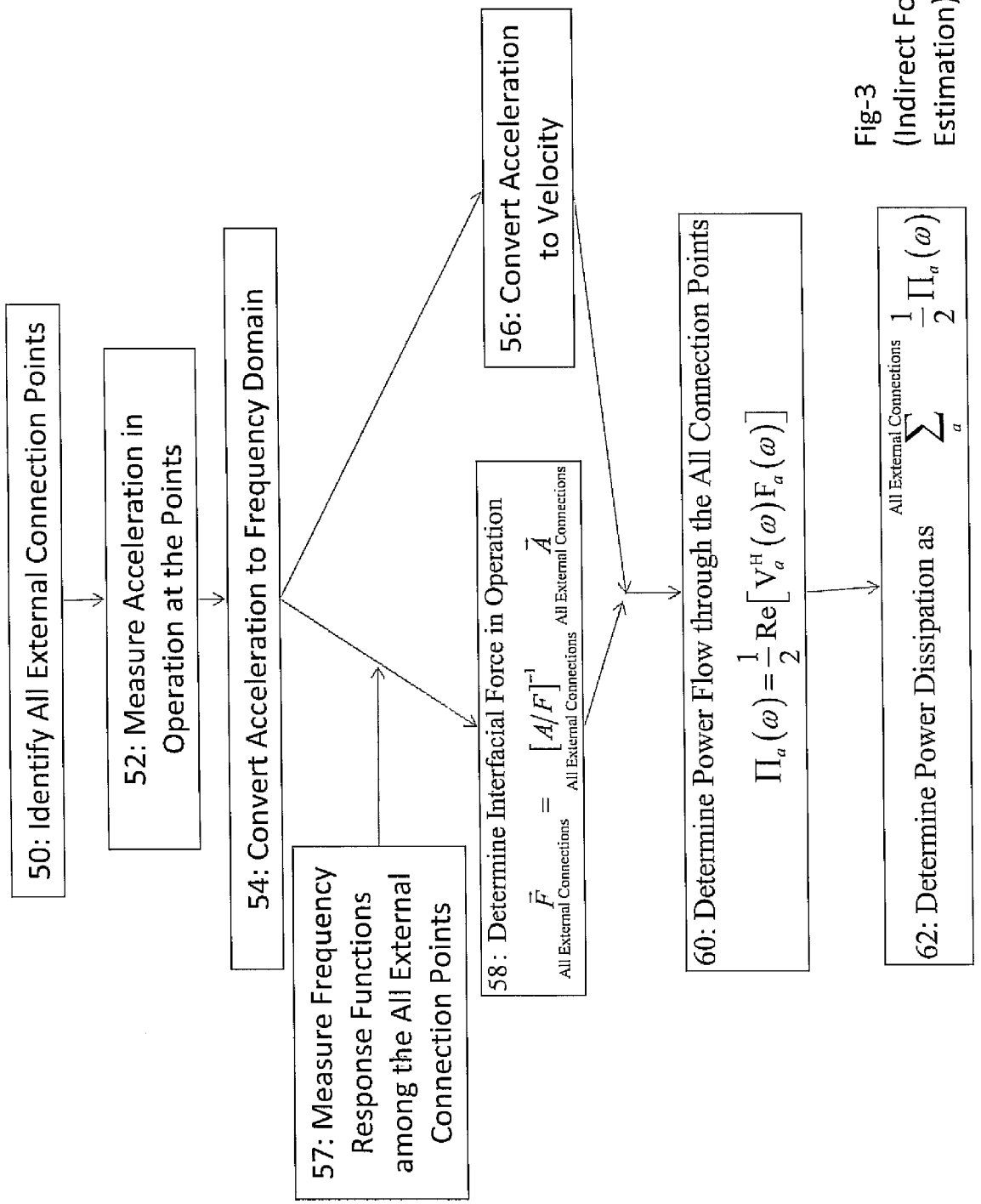
FIG. 3 is a flowchart illustrating the method of the present invention.
Figure 4:
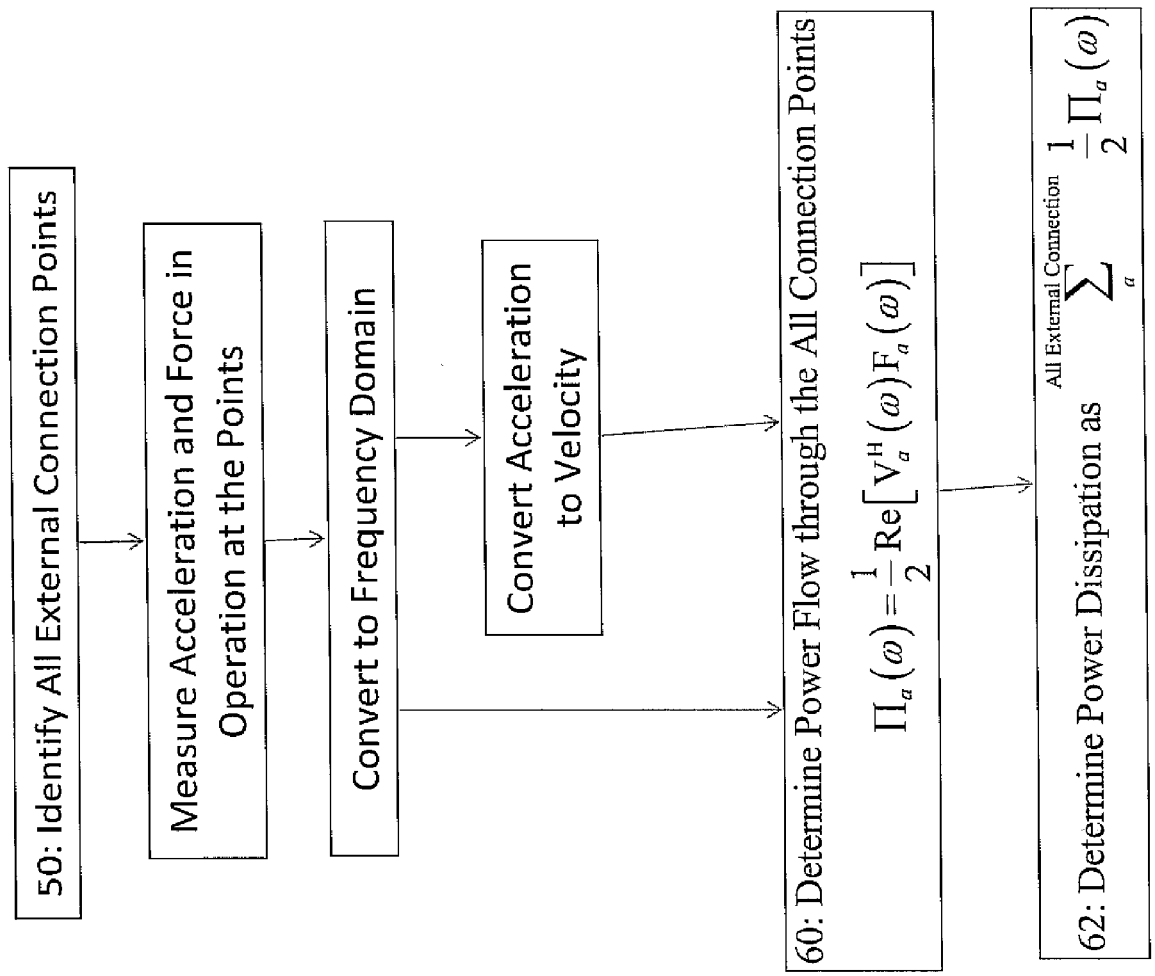
FIG. 4 is a flowchart similar to FIG. 3, but illustratively a modification thereof.

With reference now to FIG. 3, a flowchart illustrating the method of the present invention is shown. At step 50, all connection points between the vibratory system 10 and the components 12 outside the vibratory system 10 are identified. Step 50 then proceeds to step 52.

At step 52, the acceleration is measured at each connection point or connection points 14 and 16 for the examples shown in FIGS. 1 and 2. Although any conventional means may be used to measure the acceleration, such acceleration can be measured simply by attaching an accelerometer 20 to the vibratory system 10 at each connection point 14 and 16. Step 52 then proceeds to step 54.

At step 54, the acceleration values measured at step 52 are converted to the frequency domain. Any conventional method may be used to convert from the time domain to the frequency domain, such as a Fourier transform or a wavelet transform, but preferably a Fast Fourier Transform (FFT) is used for high speed yet straightforward conversion. Step 54 then proceeds to step 56 and step 58 through step 55.

At step 56, the acceleration values in the frequency domain are converted to velocity values, also in the frequency domain. This is achieved by dividing the acceleration by $j\omega$.

At step 57, the frequency response functions among the all external connection points are measured. It may be implemented by using an impact hammer or a shaker with a force sensor at the excitation tip.

At step 58, the results of steps 54 and 57 are used to determine the interfacial force at the all connection points, as described in the above equation. When the force is measured by force sensor, steps 57 and 58 are not necessary, and simply the measured force in the time domain is converted to the frequency domain.

At step 60, the power flow into the vibratory system 10 is calculated by one half of the product of the complex-conjugated velocity times the force in the frequency domain for each connection point.

At step 62, the power dissipation is determined by summing one half of the power flow into the vibratory system 10.

From the foregoing, it can be seen that the present invention provides a simple yet effective method for accurately determining the power dissipation in a vibratory system. Having described my invention, however, many modifications thereto will become apparent to those skilled in the art to which it pertains without deviation from the spirit of the invention as defined by the scope of the appended claims.

I claim:

1. A method executed by a processor for measuring mechanical power dissipation in a vibratory system comprising the steps of:
   identifying the connection points between the vibratory system and components outside the vibratory system,
   measuring acceleration at each connection point in a windowed time domain, which is then converted into the frequency domain,
   determining the frequency domain value of force for the time window at each connection point by directly measuring by a force sensor or by indirectly estimating from the measured accelerations and the measured frequency response functions at the all external connection points, converting acceleration values to velocity values in the frequency domain, and summing one quarter of the real part of the product of complex-conjugated velocity times force in the frequency domain for the all external connection points for each time window.

2. The method of claim 1 wherein said acceleration measuring step comprises the steps of attaching an accelerometer to each connection point in the vibratory system and inputting an output from each accelerometer.

3. The method of claim 1 wherein said force determining step comprises the steps of installing (inserting) a force sensor to each connection point in the vibratory system and inputting an output from each force sensor or the steps of estimating the force from the acceleration measured by accelerometer and the frequency response function measured by accelerometer and force sensor at each connection point.

4. The method of claim 1 wherein said the step of converting the time domain values for acceleration and force into the frequency domain comprises the applying a Fourier transform to each time window.

5. The method of claim 4 wherein said Fourier transform is a Fast Fourier transform.

6. The method of claim 1 wherein said step of converting said acceleration values to velocity values comprises the step of dividing the acceleration values by $j\omega$ where $j$ is the square root of $-1$ and $\omega$ is the angular velocity.

7. A shock absorber designed by using a method for measuring mechanical power dissipation comprising the steps of:

identifying the connection points between the vibratory system and components outside the vibratory system, measuring acceleration at each connection point in a windowed time domain, which is then converted into the frequency domain, determining the frequency domain value of force for the time window at each connection point by directly measuring by a force sensor or by indirectly estimating from the measured accelerations and the measured frequency response functions at the all external connection points, converting acceleration values to velocity values in the frequency domain, and slimming one quarter of the real part of the product of complex-conjugated velocity times force in the frequency domain for the all external connection points for each time window.

8. The shock absorber of claim 7 wherein said acceleration measuring step comprises the steps of attaching an accelerometer to each connection point in the vibratory system and inputting an output from each accelerometer.

9. The shock absorber of claim 7 wherein said force determining step comprises the steps of installing (inserting) a force sensor to each connection point in the vibratory system and inputting an output from each force sensor or the steps of estimating the force from the acceleration measured by accelerometer and the frequency response function measured by accelerometer and force sensor at each connection point.

10. The shock absorber of claim 7 wherein said the step of converting the time domain values for acceleration and force into the frequency domain comprises the applying a Fourier transform to each time window.

11. The shock absorber of claim 10 wherein said Fourier transform is a Fast Fourier transform.

12. The shock absorber of claim 7 wherein said step of converting said acceleration values to velocity values comprises the step of dividing the acceleration values by $j\omega$ where $j$ is the square root of $-1$ and $\omega$ is the angular velocity.

* * * * *